(12) United States Patent
Sun et al.

(10) Patent No.: US 12,507,173 B2
(45) Date of Patent: Dec. 23, 2025

(54) METHODS FOR DISCONTINUOUS RECEPTION (DRX) IN CONJUNCTION WITH GUARANTEED LOW-LATENCY SERVICES

(71) Applicant: Telefonaktiebolaget LM Ericsson (publ), Stockholm (SE)

(72) Inventors: Ying Sun, Täby (SE); Yanpeng Yang, Järfälla (SE); Mats Folke, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 18/251,046

(22) PCT Filed: Oct. 21, 2021

(86) PCT No.: PCT/SE2021/051052
§ 371 (c)(1),
(2) Date: Apr. 28, 2023

(87) PCT Pub. No.: WO2022/115015
PCT Pub. Date: Jun. 2, 2022

(65) Prior Publication Data
US 2023/0413178 A1 Dec. 21, 2023

Related U.S. Application Data

(60) Provisional application No. 63/117,702, filed on Nov. 24, 2020.

(51) Int. Cl.
*H04W 4/00* (2018.01)
*H04W 52/02* (2009.01)
(Continued)

(52) U.S. Cl.
CPC ..... *H04W 52/0235* (2013.01); *H04W 72/232* (2023.01); *H04W 76/28* (2018.02)

(58) Field of Classification Search
None
See application file for complete search history.

(56) References Cited

U.S. PATENT DOCUMENTS

2014/0269475 A1 9/2014 Ehsan et al.
2024/0080763 A1* 3/2024 Lin .................. H04W 52/0229

FOREIGN PATENT DOCUMENTS

EP 2214442 A1 8/2010
WO 2020034283 A1 2/2020

OTHER PUBLICATIONS

"38.331 V16.6.0", 5G; NR; Radio Resource Control (RRC); Protocol specification, ETSI TS 138 331 V16.6.0 (Release 16), Oct. 2021, pp. 1-948.

(Continued)

*Primary Examiner* — Zewdu A Beyen
(74) *Attorney, Agent, or Firm* — Murphy, Bilak & Homiller, PLLC

(57) ABSTRACT

Embodiments include methods for a user equipment (UE) configured to operate in a wireless network according to a periodic discontinuous reception (DRX) cycle that includes periodic DRX on durations. Such methods include awakening for at least a first duration from a low energy consumption state. The first duration is not within any of the periodic DRX on durations. Such methods include, during the first duration, monitoring for an activation signal occurring at a first offset before a next subsequent resource of a configured grant of periodic uplink transmission resources (UL CG) or of a semi-persistent schedule of periodic downlink reception resources (DL SPS). Other embodiments include comple- (Continued)

mentary methods for a network node, as well as UEs and network nodes configured to perform such methods.

16 Claims, 9 Drawing Sheets

(51) Int. Cl.
*H04W 72/232* (2023.01)
*H04W 76/28* (2018.01)

(56) References Cited

OTHER PUBLICATIONS

"3GPP TR 23.758 V17.0.0", 3rd Generation Partnership Project; Technical Specification Group Services and System Aspects; Study on application architecture for enabling Edge Applications; (Release 17), Dec. 2019, pp. 1-74.

"3GPP TS 23.501 V16.0.0", 3rd Generation Partnership Project; Technical Specification Group Services and System Aspects; System Architecture for the 5G System; Stage 2 (Release 16), Mar. 2019, pp. 1-318.

"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.

"Activation of CG and DRX Inactivity Timer", 3GPP TSG-RAN WG2 #112e, Tdoc R2-2010621, Electronic meeting, Nov. 2-13, 2020, pp. 1-3.

"3GPP TS 38.213 V16.0.0", 3rd Generation Partnership Project; Technical Specification Group Radio Access Network; NR; Physical layer procedures for control (Release 16), Dec. 2019, pp. 1-146.

\* cited by examiner

```
-- ASN1START
-- TAG-CONFIGUREDGRANTCONFIG-START
ConfiguredGrantConfig ::=        SEQUENCE {
    frequencyHopping                 ENUMERATED {intraSlot, interSlot}                             OPTIONAL,   -- Need S,
    cg-DMRS-Configuration            DMRS-UplinkConfig,
    mcs-Table                        ENUMERATED {qam256, qam64LowSE}                               OPTIONAL,   -- Need S
    mcs-TableTransformPrecoder       ENUMERATED {qam256, qam64LowSE}                               OPTIONAL,   -- Need S
    uci-OnPUSCH                      SetupRelease { CG-UCI-OnPUSCH }                               OPTIONAL,   -- Need M
    resourceAllocation               ENUMERATED { resourceAllocationType0, resourceAllocationType1, dynamicSwitch },
    rbg-Size                         ENUMERATED {config2}                                          OPTIONAL,   -- Need S
    powerControlLoopToUse            ENUMERATED {n0, n1},
    p0-PUSCH-Alpha                   P0-PUSCH-AlphaSetId,
    transformPrecoder                ENUMERATED {enabled, disabled}                                OPTIONAL,   -- Need S
    nrofHARQ-Processes               INTEGER(1..16),
    repK                             ENUMERATED {n1, n2, n4, n8},
    repK-RV                          ENUMERATED {s1-0231, s2-0303, s3-0000}                        OPTIONAL,   -- Need R
    periodicity                      ENUMERATED {
                                         sym2, sym7, sym1x14, sym2x14, sym4x14, sym5x14, sym8x14, sym10x14, sym16x14, sym20x14,
                                         sym32x14, sym40x14, sym64x14, sym80x14, sym128x14, sym160x14, sym256x14, sym320x14,
                                         sym512x14, sym640x14, sym1024x14, sym1280x14, sym2560x14, sym5120x14, sym6, sym1x12,
                                         sym2x12, sym4x12, sym5x12, sym8x12, sym10x12, sym16x12, sym20x12, sym32x12, sym40x12,
                                         sym64x12, sym80x12, sym128x12, sym160x12, sym256x12, sym320x12, sym512x12, sym640x12,
                                         sym1280x12, sym2560x12
                                     }
    configuredGrantTimer             INTEGER (1..64)                                               OPTIONAL,   -- Need R
    rrc-ConfiguredUplinkGrant        SEQUENCE {
        timeDomainOffset                 INTEGER (0..5119),
        timeDomainAllocation             INTEGER (0..15),
        frequencyDomainAllocation        BIT STRING (SIZE(18)),
        antennaPort                      INTEGER (0..31),
        dmrs-SeqInitialization           INTEGER (0..1)                                            OPTIONAL,   -- Need R
        precodingAndNumberOfLayers       INTEGER (0..63),
        srs-ResourceIndicator            INTEGER (0..15)                                           OPTIONAL,   -- Need R
        mcsAndTBS                        INTEGER (0..31),
        frequencyHoppingOffset           INTEGER (1.. maxNrofPhysicalResourceBlocks-1)             OPTIONAL,   -- Need R
        pathlossReferenceIndex           INTEGER (0..maxNrofPUSCH-PathlossReferenceRSs-1),
        ...
    }                                                                                              OPTIONAL,   -- Need R
}

CG-UCI-OnPUSCH ::=               CHOICE {
    dynamic                          SEQUENCE (SIZE (1..4)) OF BetaOffsets,
    semiStatic                       BetaOffsets
}
-- TAG-CONFIGUREDGRANTCONFIG-STOP
-- ASN1STOP
```

FIG. 7

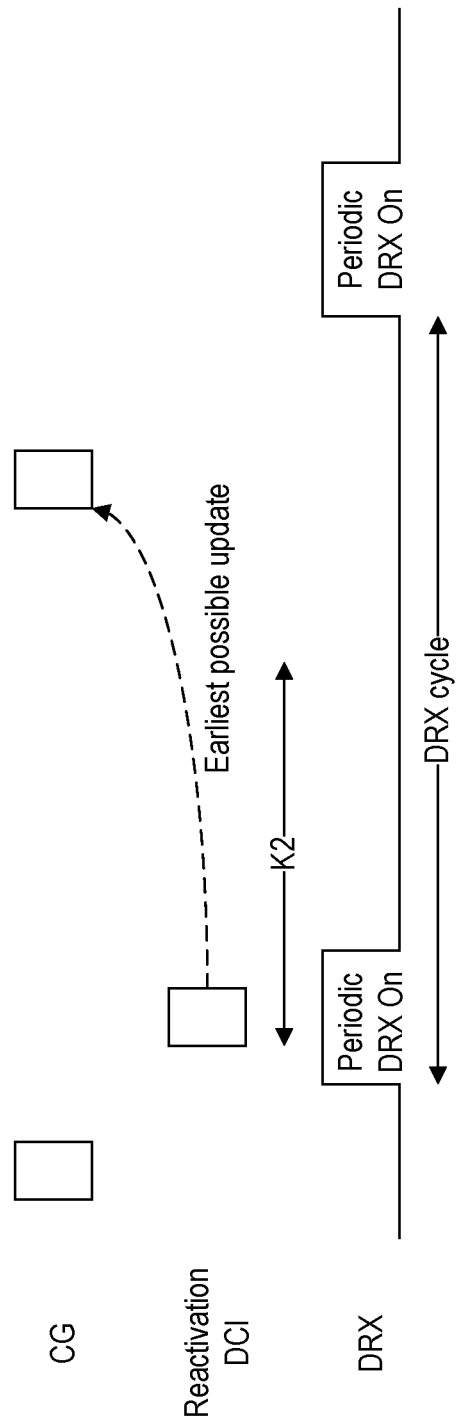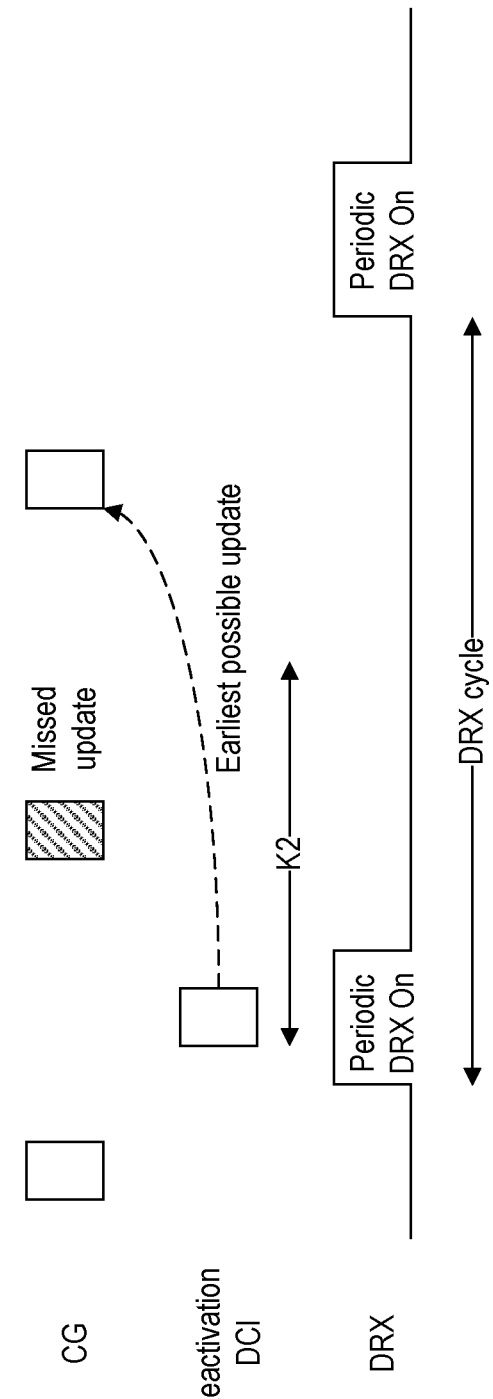

METHODS FOR DISCONTINUOUS RECEPTION (DRX) IN CONJUNCTION WITH GUARANTEED LOW-LATENCY SERVICES

TECHNICAL FIELD

The present disclosure generally relates to wireless communication networks, and more specifically to discontinuous reception (DRX) techniques for reducing wireless device energy consumption for applications or services (e.g., extended reality and cloud gaming) needing guaranteed low latency.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a, b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211a-b and 221a-b shown in FIG. 2. Depending on the particular cell in which it is located, a UE 205 can communicate with the gNB or ng-eNB serving that particular cell via the NR or LTE radio interface, respectively. Although FIG. 2 shows gNBs and ng-eNBs separately, it is also possible that a single NG-RAN node provides both types of functionality.

5G/NR technology shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE.

In NR, UL and DL data transmissions (e.g., on PUSCH and PDSCH, respectively) can take place with or without an explicit grant or assignment of resources by the network (e.g., gNB). In general, UL transmissions are usually referred to as being "granted" by the network (i.e., "UL grant"), while DL transmissions are usually referred to as taking place on resources that are "assigned" by the network (i.e., "DL assignment"). In case of a transmission based on an explicit grant/assignment, downlink control information (DCI) is sent to the UE informing it of specific radio resources to be used for the transmission.

In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS, for DL), configured grant (CG, for UL), or grant-free transmissions.

Extended Reality (XR) and Cloud Gaming are some of the most important 5G media applications under consideration in the industry. XR is an umbrella term that refers to all real-and-virtual combined environments and human-machine interactions generated by computer technology and wearables. It includes exemplary forms such as Augmented Reality (AR), Mixed Reality (MR), and Virtual Reality (VR), as well as various other types that span or sit between these examples. In the following, the term "XR" also refers to cloud gaming and related applications.

Edge Computing (EC) is generally viewed as an important network architecture enabler for XR. In general, EC facilitates deployment of cloud computing capabilities and service environments close to the cellular radio access network (RAN). It can provide benefits such as lower latency and higher bandwidth for user-plane (UP, e.g., data) traffic, as well as reduced backhaul traffic to the 5G core network (5GC). 3GPP is also studying prospects for several new services on application architecture for enabling Edge Applications, as described further in 3GPP TR 23.758 (v17.0.0). Edge Applications are expected to take advantage of the low latencies enabled by 5G and EC network architecture to reduce the end-to-end application-level latencies.

Device energy consumption is an important requirement for XR and cloud gaming. Cloud gaming devices are expected to include smartphones or tablets. In addition to smartphones, XR experience is expected to be delivered via Head Mounted Displays (HMDs) such as augmented reality (AR) glasses. AR glasses can have an embedded 5G modem providing 5G connectivity, or the AR glasses can be tethered (e.g., via USB, Bluetooth, or WiFi) to a UE that has 5G connectivity. In some cases, AR computation can be split between the AR glasses and Edge servers, which can reduce the overall device energy consumption on the device if the resulting traffic from the computation split does not increase the UE power consumption significantly.

In both cases, the 5G connection must carry AR application traffic and the UE energy consumption due to that traffic has a significant bearing on the commercial viability of AR glasses. For example, if AR glasses are similar to prescription glasses and are worn for long durations, their energy consumption may need to be significantly lower than that of smartphone.

SUMMARY

Accordingly, it is expected that DRX (discussed above) will be an important feature for reducing energy consumption of devices used for XR and cloud gaming. However, there can be various problems, issues, and/or difficulties when using DRX together with UL CG and/or DL SPS, such that these combinations may not produce an expected and/or desired reduction in device energy consumption for XR and cloud gaming applications.

Embodiments of the present disclosure provide specific improvements to communication between UEs and network nodes in a wireless network, such as by providing, enabling, and/or facilitating solutions to overcome exemplary problems summarized above and described in more detail below.

Embodiments include methods (e.g., procedures) for a UE (e.g., wireless device) configured to operate in a wireless network (e.g., E-UTRAN, NG-RAN) according to a periodic DRX cycle comprising periodic DRX on durations.

These exemplary methods can include awakening for at least a first duration from a low energy consumption state. The first duration is not within any of the periodic DRX on durations of the UE's periodic DRX cycle. These exemplary methods can also include, during the first duration, monitoring for an activation signal occurring at a first offset before a next subsequent resource of a configured grant of periodic uplink transmission resources (UL CG) or of a semi-persistent schedule of periodic downlink reception resources (DL SPS).

In some embodiments, these exemplary methods can also include receiving the UL CG or the DL SPS from a network node in the wireless network. In some embodiments, an indication of at least one of the following can be included in the received UL CG or the received DL SPS: a start of the first duration, a length of the first duration, and the first offset.

In some embodiments, these exemplary methods can also include, based on detecting the activation signal during the first duration, selectively transmitting UL data during the next subsequent resource of the UL CG. In some of these embodiments, selectively transmitting can include, based on determining that it has no UL data to transmit, returning to the low energy consumption state after the first duration and refrain from transmitting during the next subsequent resource of the UL CG. In some of these embodiments, selectively transmitting can include, based on determining that it has UL data to transmit, transmitting at least a portion of the UL data during the next subsequent resource of the UL CG and returning to the low energy consumption state after transmitting.

In some embodiments, monitoring for the activation signal can include monitoring for downlink control information (DCI) on a physical downlink control channel (PDCCH). In such embodiments, one of the following can apply:
the next subsequent resource is on a PUSCH and the first offset is a PDCCH-PUSCH scheduling delay (K2); or
the next subsequent resource is on a physical downlink shared channel (PDSCH) and the first offset is a PDCCH-PDSCH scheduling delay (K0).

In some of these embodiments, the first offset can be included in the DCI.

In some embodiments, these exemplary methods can also include receiving, from a network node in the wireless network, a wake-up command during a previous one of the UE's periodic DRX on durations. In such embodiments, awakening for at least the first duration can be responsive to the wake-up command. In some of these embodiments, the wake-up command can be received in one of the following: DCI, media access control (MAC) layer control element (CE), or radio resource control (RRC) message. In some of these embodiments, the wake-up command can be received in a DCI according to a format 0_2. In some of these embodiments, an indication of at least one of the following can be included with the wake-up command: a start of the first duration, a length of the first duration, and the first offset.

In some of these embodiments, these exemplary methods can also include transmitting, to the network node, a feedback signal indicating correct reception of the wake-up command. In some variants, the feedback signal can be transmitted during the first duration before monitoring for the activation signal.

Other embodiments include exemplary methods (e.g., procedures) for a network node (e.g., base station, eNB, gNB, ng-eNB, etc., or component thereof) to communicate with a UE configured to operate in a wireless network (e.g., E-UTRAN, NG-RAN) according to a periodic DRX cycle comprising periodic DRX on durations.

These exemplary methods can include transmitting, to a UE, an activation signal associated with a configured grant of periodic uplink transmission resources (UL CG) or with a semi-persistent schedule of periodic downlink reception resources (DL SPS). The activation signal is transmitted at a first offset before the next subsequent resource of the UL CG or of the DL SPS, but not within any of the UE's periodic DRX on durations.

In some embodiments, these exemplary methods can also include transmitting the UL CG or the DL SPS to the UE. In some embodiments, an indication of at least one of the following can be included in the transmitted UL CG or the transmitted DL SPS: a start of the first duration, a length of the first duration, and the first offset.

In some embodiments, these exemplary methods can also include monitoring for UL data, transmitted by the UE, during the next subsequent resource of the UL CG.

In some embodiments, transmitting the activation signal can include transmitting DCI on a PDCCH. In such embodiments, one of the following can apply:
the next subsequent resource is on a PUSCH and the first offset is a PDCCH-PUSCH scheduling delay (K2); or
the next subsequent resource is on a PDSCH and the first offset is a PDCCH-PDSCH scheduling delay (K0).
In some of these embodiments, the first offset can be included in the DCI.

In some embodiments, these exemplary methods can also include transmitting, to the UE, a wake-up command during a previous one of the UE's periodic DRX on durations. The wake-up command indicates that the UE should wake up during a subsequent first duration to monitor for the activation signal, and the first duration is not within any of the UE's periodic DRX on durations. In some of these embodiments, the wake-up command can be transmitted in one of the following: DCI, media access control (MAC) layer control element (CE), and radio resource control (RRC) message. In of these embodiments, the wake-up command can be transmitted in a DCI according to a format 0_2. In some of these embodiments, an indication of at least one of the following can be included with the wake-up command: a start of the first duration, a length of the first duration, and the first offset.

In some of these embodiments, these exemplary methods can also include receiving, from the UE, a feedback signal indicating correct reception of the wake-up command. In some of these embodiments, the feedback signal can be received during the first duration and the activation signal can be transmitted in response to receiving the feedback signal.

Other embodiments include UEs (e.g., wireless devices) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can reduce and/or eliminate excess UL or DL transmission latency without requiring aligning of an activation DCI to a UE's DRX on duration. Moreover, these techniques facilitate better block error rate (BLER) performance for UL CG or DL SPS transmissions, since the network (or UE) can receive UL CG (or DL SPS) transmissions that are more proximate in time to corresponding UL (or DL) channel estimates. Overall, embodiments facilitate more efficient usage of available transmission resources (e.g., frequency spectrum), energy-efficient UE operation via DRX, and improved quality-of-experience for users of various applications (including XR and cloud gaming applications) due to reduced UL or DL transmission latency.

These and other objects, features, and advantages of embodiments of the present disclosure will become apparent upon reading the following Detailed Description in view of the Drawings briefly described below.

BRIEF DESCRIPTION OF THE DRAWINGS

FIG. 7 shows an exemplary ASN.1 data structure for a ConfiguredGrantConfig information element (IE) used for configuration of type-1 and type-2 uplink (UL) configured grants for NR.

FIGS. 8-9 show two timing diagrams that illustrate various problems related to combined operation of DRX and UL CGs.

DETAILED DESCRIPTION

Figure 1:
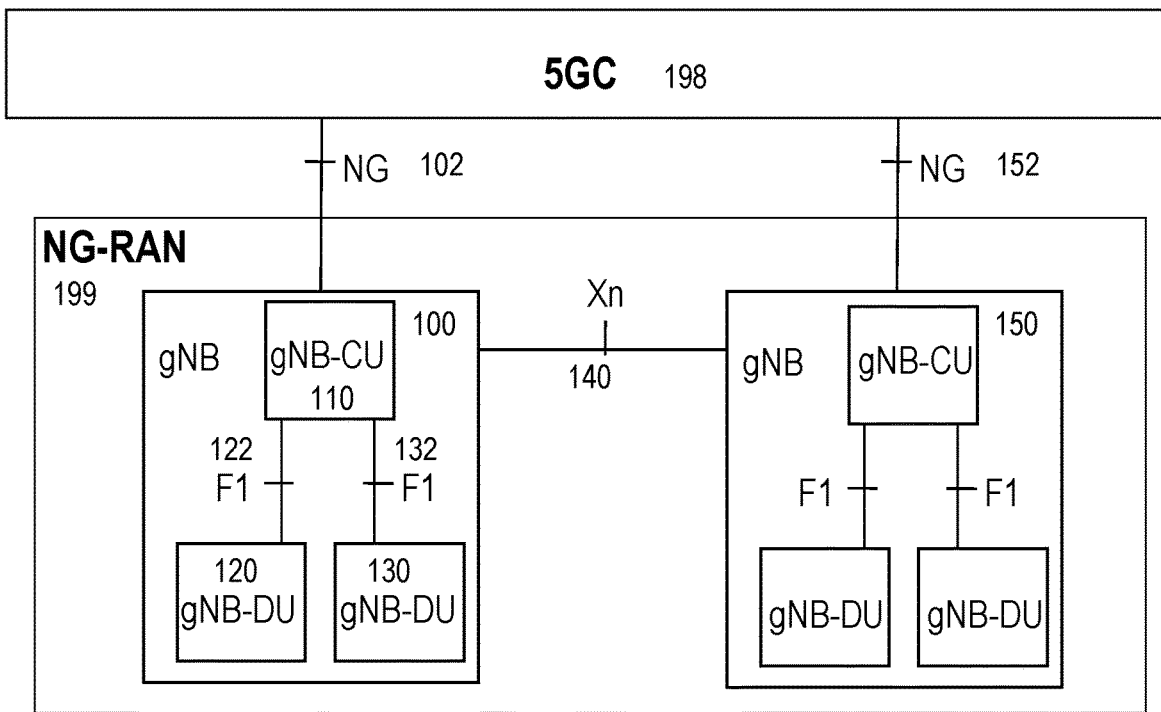
FIGS. 1-2 illustrate two high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, it is expected that DRX will be an important feature for reducing energy consumption of devices used for XR and cloud gaming. However, there can be various problems, issues, and/or difficulties when using DRX together with UL CG and/or DL SPS, such that these combinations may not produce an expected and/or desired reduction in device energy consumption for XR and cloud gaming applications. This is discussed in more detail below.

Figure 2:
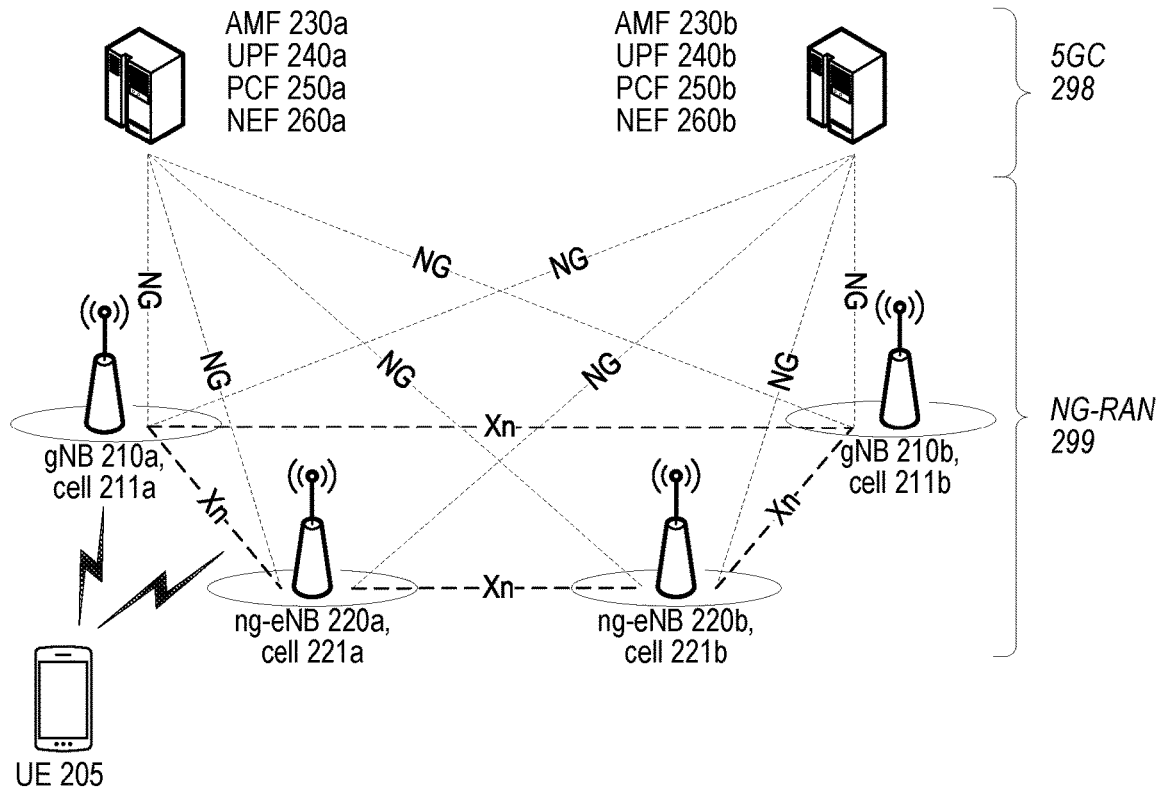
Figure 3:
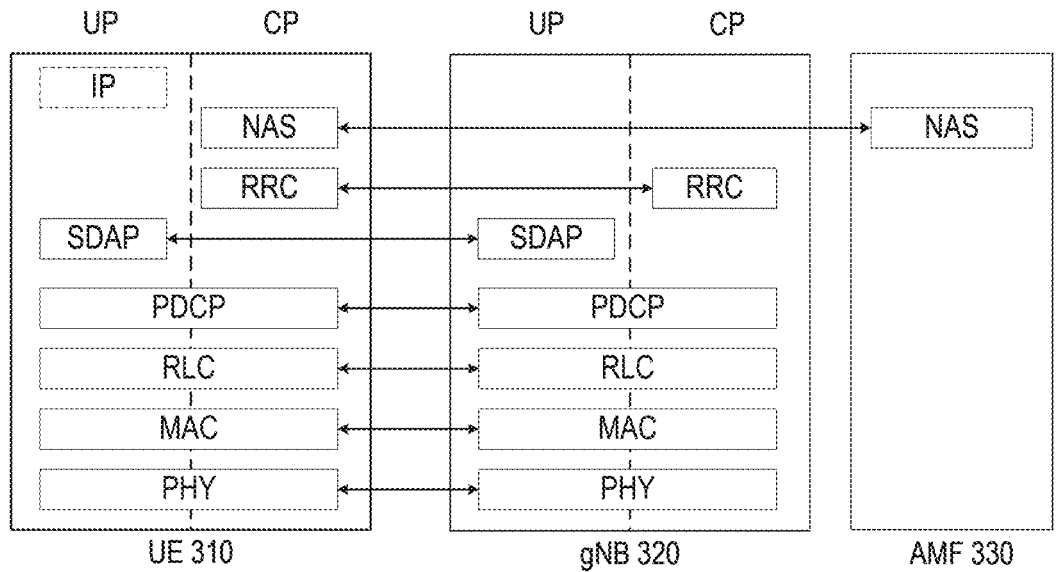
FIG. 3 shows an exemplary configuration of NR user plane (UP) and control plane (CP) protocol stacks.

FIG. 3 shows an exemplary configuration of NR user plane (UP) and control plane (CP) protocol stacks between a UE, a gNB, and an AMF, such as those shown in FIGS. 1-2. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QoS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

Figure 4:
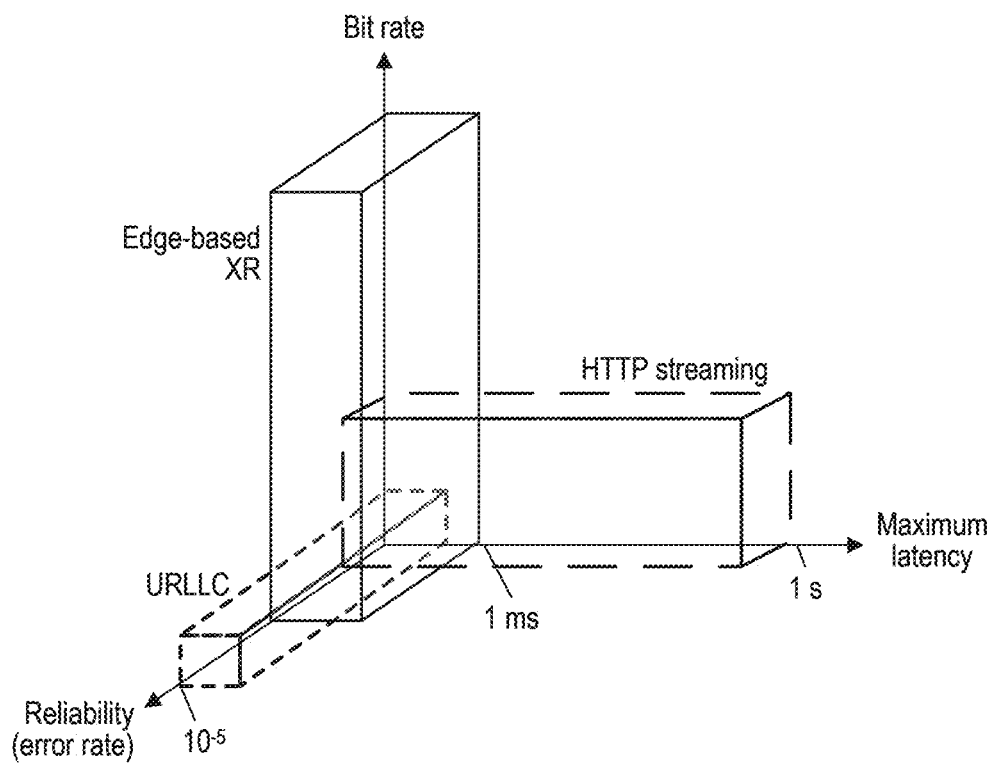
FIG. 4 illustrates a comparison of various characteristics or requirements between Extended Reality (XR) and other 5G applications.
Figure 5:
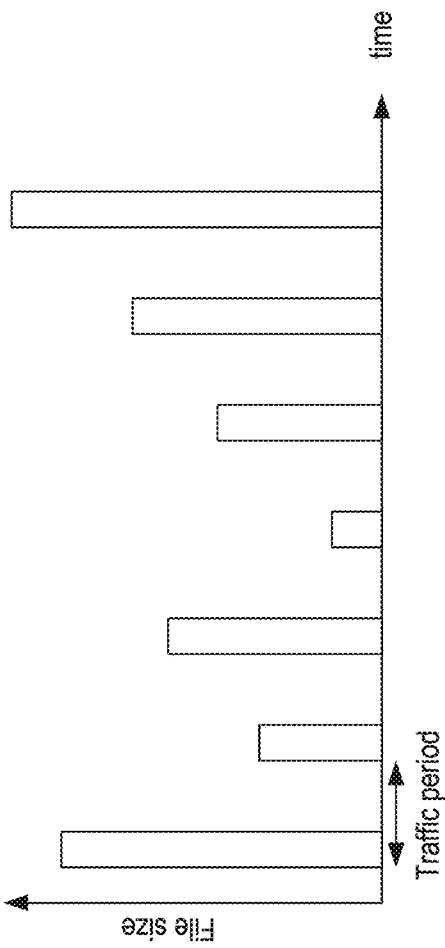
FIG. 5 illustrates some exemplary traffic characteristics for XR.

FIG. 4 illustrates a comparison of various characteristics requirements for XR and other applications. In particular, FIG. 4 shows a comparison of latency, reliability, and bitrate requirements for URLLC, streaming, and EC-based XR. While URLLC services have extreme requirements of 1-ms latency and of $10^{-5}$, EC-based XR can have relaxed requirements 5-10 ms and $10^{-4}$ reliability. However, XR services can require a much higher bite rate than either URLLC or streaming. (e.g., due to codec inefficiency). EC-based XR traffic can also be very dynamic, e.g., due to eye/viewport tracking. In general, the traffic can appear to be periodic but with variable file sizes, as illustrated in FIG. 5.

When a UE is in RRC_IDLE or RRC_INACTIVE modes, it monitors PDCCH periodically to check for scheduling of paging requests to be subsequently transmitted on physical downlink shared channel (PDSCH). In RRC_CONNECTED mode, a UE monitors PDCCH for scheduling of UL/DL data transmissions (i.e., on PDSCH and physical UL shared channel (PUSCH), respectively) and for other purposes. In between these monitoring occasions, the UE can go to sleep to reduce energy consumption. The amount of UE power savings is related to DRX on duration as a fraction of the entire DRX duty cycle.

This sleep-wake cycle in RRC_CONNECTED mode is also known as DRX or alternately connected DRX (C-DRX) to distinguish it from DRX in RRC_IDLE mode described above. The following discussion relates generally to DRX operations in RRC_CONNECTED mode but the terms "DRX" and "C-DRX" are used interchangeably unless specifically noted otherwise.

Figure 6:
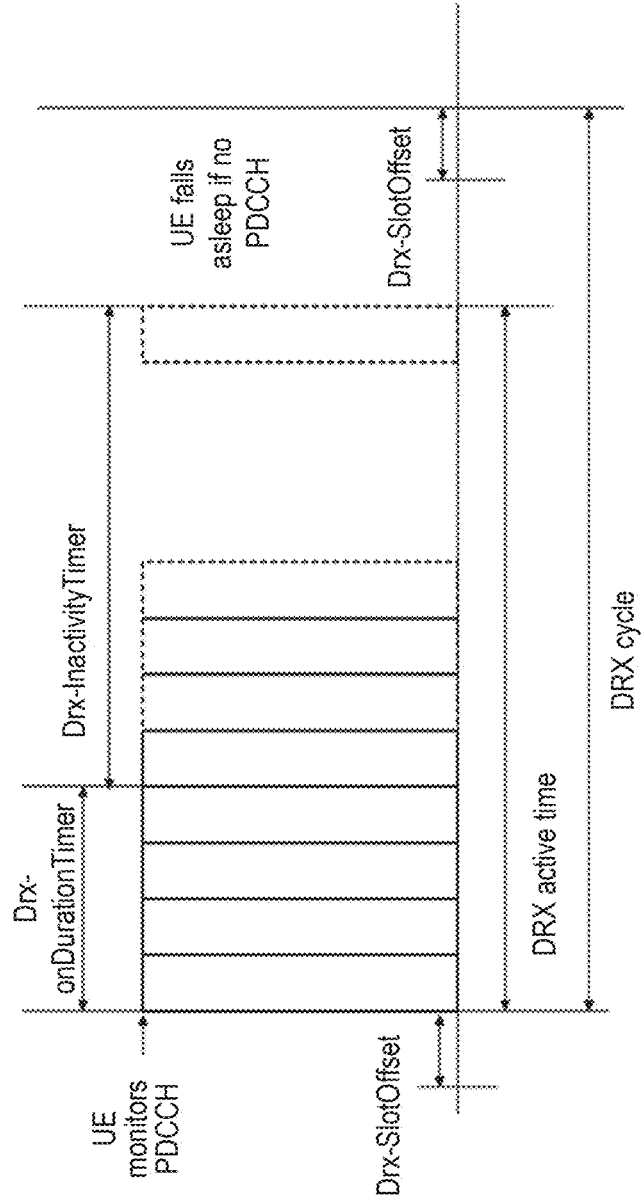
FIG. 6 shows a timing diagram that illustrates exemplary discontinuous reception (DRX) operation of a user equipment (UE).

FIG. 6 shows a timing diagram that illustrates exemplary DRX operation. The network configures UE DRX parameters and DRX operational mode (e.g., Short DRX and/or Long DRX, a scheme in which initially a short and faster cyclic pattern occurs). At a high level, if the UE successfully decodes a PDCCH, the UE stays awake and starts an inactivity timer supervising a switch back to DRX. If no DCI is received while the inactivity timer is running, UE directly switch to sleep.

In more detail, CDRX operation is based on a DRX cycle, a DRX active time, a DRX-onDurationTimer, a DRX-slotOffset, and a DRX-inactivityTimer. There are defined as follows:

DRX-onDurationTimer: duration at the beginning of a DRX cycle me during which UE waits to receive PDCCH after waking up from DRX. The on duration is a periodic phase which reoccurs with each start of a DRX cycle. This phase defines the minimum average awake time of a UE and can be configured (via RRC) from 1 to 1600 ms. There is only one DRX-onDurationTimer regardless of the DRX operational mode configured at any given time.

DRX-slotOffset: delay from the beginning of a subframe before UE starts the DRX-onDurationTimer. This value can be configured from 0 to 31.

DRX-InactivityTimer(s): duration after occasion in which a PDCCH indicates a new UL or DL transmission for the UE MAC entity. The UE starts the first inactivity timer supervising the switch to DRX when it successfully decodes PDCCH for an initial transmission (not for retransmissions). If short DRX is configured, the UE starts the inactivity timer supervising the switch from short DRX cycles to long DRX cycles when it enters DRX (i.e., at expiry of the first inactivity timer). According to 3GPP TS38.331, this time value can be configured from 0 to 2560 ms. If the UE receives a valid DCI while the DRX-inactivityTimer is running, it extends the timer and continues to monitor PDCCH. If the DRX-inactivityTimer expires, the UE stops PDCCH monitoring and goes to sleep until the end of the current DRX cycle.

DRX active time: The total time during which the UE is awake and monitoring PDCCH, i.e., the duration from the beginning of the DRX on duration until inactivity timer expiration. The minimum active time is equal to the DRX-onDurationTimer value and the maximum is undefined (e.g., infinite).

DRX cycle: The total time of DRX active time and UE sleep time. This is also configurable, e.g., as a trade-off value between reduced UE energy consumption and UE delay requirements. For long DRX cycle this value can vary from 10 to 10240 ms, and for short DRX cycle this value can vary from 2 to 640 ms.

The parameters listed above show a simplified view of the DRX operation. At a more complex level, DRX operation also depends on these additional variables and timers:

DRX-RetransmissionTimerDL (per DL HARQ process except for the broadcast process): the maximum duration until a DL retransmission is received.

DRX-RetransmissionTimerUL (per UL HARQ process): the maximum duration until a grant for UL retransmission is received.

DRX-ShortCycleTimer (optional): the duration the UE shall follow the Short DRX cycle.

DRX-HARQ-RTT-TimerDL (per DL HARQ process except for the broadcast process): the minimum duration before a DL assignment for HARQ retransmission is expected by the MAC entity.

DRX-HARQ-RTT-TimerUL (per UL HARQ process): the minimum duration before a UL HARQ retransmission grant is expected by the MAC entity.

ps-Wakeup (optional): the configuration to start associated drx-onDurationTimer in case DCP is monitored but not detected.

ps-PeriodicCSI_Transmit (optional): the configuration to report periodic channel state information (CSI) during the time duration indicated by drx-onDurationTimer in case DCP is configured but associated drx-onDurationTimer is not started.

ps-TransmitPeriodicL1-RSRP (optional): the configuration to transmit periodic L1-RSRP report(s) during the time duration indicated by drx-onDurationTimer in case DCP is configured but associated drx-onDurationTimer is not started.

UE energy consumption generally varies linearly with the DRX active time, e.g., as a fraction of the DRX cycle. However, reducing the energy consumption by increasing the DRX cycle comes with a cost of delaying the UE's wake-up from sleep, which will increase latency for network-initiated transactions such as paging and handover. Additionally, the performance of all delay-sensitive applications will degrade as the length of DRX sleep increases.

NR data scheduling can be performed dynamically, e.g., on a per-slot basis. In each slot, the base station (e.g., gNB) transmits DCI over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

DCI can also include information about various timing offsets (e.g., slots or subframes) between PDCCH and PDSCH, PUSCH, HARQ, and/or channel state information reference signals (CSI-RS). For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and a responsive UE HARQ ACK/NACK transmission on PUSCH. In addition, offset K3 represents the number of slots between this responsive ACK/NACK and a corresponding retransmission of data on PDSCH. In addition, offset K2 represents the number of slots between the UE's reception of a UL grant DCI (e.g., formats 0_0 or 0_1) on PDCCH and the subsequent PUSCH transmission. Each of these offsets can take on values of zero and positive integers.

Data transmission can also be scheduled to occur periodically without explicit grants. Such transmissions can be referred to as semi-persistent scheduling (SPS, for DL), configured grant (CG, for UL), or grant-free transmissions. There are two types of configured UL grants for NR. Type-1 are configured via RRC signaling only while for type-2, some parameters are preconfigured via RRC signaling and some parameters are dynamically indicated. FIG. 7 shows an exemplary ASN.1 data structure for a ConfiguredGrantConfig information element (IE) used for RRC configuration of NR type-1 and type-2 UL configured grants. The information in the rrc-ConfiguredUplinkGrant field is Type1-specific. Corresponding information can be provided for type-2 by a configured grant activation DCI, which is scrambled with a configures scheduling radio network temporary identifier (CS-RNTI) assigned to the UE by the network.

For scheduling activation or release, a UE validates a received DCI according to a particular DCI format (e.g., 0_0, 0_1, etc. discussed above) including an DL SPS assignment or a type-2 configured UL grant based on the following:

CRC of a corresponding DCI format is scrambled with a CS-RNTI provided by cs-RNTI;

New Data Indicator field in the DCI format for the enabled transport block is set to '0';

DFI flag field, if present, in the DCI format is set to '0'; and

If validation is for scheduling activation and the PDSCH-to-HARQ feedback timing indicator field (also known as "k1") in the DCI format is present, the PDSCH-to-HARQ feedback timing indicator field does not provide an inapplicable value from dl-DataToUL-ACK.

If a UE is provided a single configuration for UL grant type-2 PUSCH or for SPS PDSCH, validation of the particular DCI format is achieved if all fields for the DCI format are set according to values for that DCI format given in 3GPP TS 38.213 Tables 10.2-1 (activation) or 10.2-2 (release), which repeated below.

3GPP TS 38.213 Table 10.2-1

|  | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For enabled transport block: set to all '0's |

3GPP TS 38.213 Table 10.2-2

|  | DCI format 0_0 | DCI format 0_1 |
|---|---|---|
| HARQ process number | set to all '0's | set to all '0's |
| Redundancy version | set to '00' | set to '00' |
| MCS | set to all '0's | set to all '0's |
| Resource block assignment | set to all '0's | set to all '0's |

If a UE is provided more than one configurations for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by Configuredgrantconfig-index or by SPSconfig-index, respectively. Validation of the DCI format is achieved if the RV field for the DCI format is set as in 3GPP TS 38.213 Table 10.2-3, which is repeated below.

3GPP TS 38.213 Table 10.2-3

|  | DCI format 0_0/0_1/0_2 | DCI format 1_0/1_2 | DCI format 1_1 |
|---|---|---|---|
| Redundancy version | set to all '0's | set to all '0's | For the enabled transport block: set to all '0's |

In any case, if validation is achieved, the UE considers the information in the DCI format as a valid activation or valid release of DL SPS or type-2 configured UL grant. If validation is not achieved, the UE discards all the information in the DCI format However, various problems, issues, and/or difficulties can occur when UL CG are used with DRX, particularly when combined with DL SPS or dynamic DL scheduling for periodic traffic. Since the UE's DRX on duration must be aligned with PDCCH for DL packet transmission or DL SPS transmission, it might be not possible to also align the DRX on duration with the timing of an UL CG. In particular, the restriction that a (re)activation DCI for the UL CG must be sent during the UE's DRX on duration can degrade performance since the difference between the DRX on duration and the next UL CG transmission instance can be too long or too short.

These difficulties are illustrated by the examples shown in FIGS. 8-9. In particular, FIG. 8 shows a timing arrangement in which the UE receives the UL CG reactivation DCI in one of the UE's periodic DRX on duration. However, this periodic DRX on duration is so long before the next UL CG instance that the network's UL estimation (i.e., on which the UL CG allocation is based) will no longer be accurate. As a result, the UE's UL transmission will likely not meet the target block error rate (BLER).

In contrast, FIG. 9 shows a timing arrangement in which the periodic DRX on duration in which the UE receives the reactivation DCI is so near in time to the next UL CG instance, that the UE cannot finish processing the reactivation DCI and thus misses the UL transmission opportunity. Put differently, FIG. 9 illustrates a case where the UE receives the reactivation DCI less than K2 before the next UL transmission opportunity associated with UL CG.

To overcome the difficulties illustrated by FIG. 8, the network must utilize more conservative link adaptation and resource allocation for UL CG and DL SPS. This will result in less efficient usage of available time-frequency resources within each cell. To overcome the difficulties illustrated by FIG. 9, the network must support multiple K2 values for different UEs. This results in more implementation complexity in the UL scheduler for each cell.

Accordingly, embodiments of the present disclosure provide flexible and efficient techniques for UL CG or DL SPS activation for a UE while the UE is operating in DRX, such that a UE can take advantage of available UL CG transmission resources (e.g., transmission opportunities) or DL SPS reception resources (e.g., reception opportunities) without excess delay.

Such embodiments can provide various benefits and/or advantages. For example, such techniques can reduce and/or eliminate excess UL or DL transmission latency without requiring aligning of an activation DCI to a UE's DRX on duration. Moreover, these techniques facilitate better BLER performance for UL CG or DL SPS transmissions, since the network (or UE) can receive UL CG (or DL SPS) transmissions that are more proximate in time to UL (or DL) channel estimates made by the network (or UE). Overall, these techniques facilitate more efficient usage of available transmission resources (e.g., frequency spectrum), energy-efficient UE operation via DRX, and improved quality-of-experience for users of various applications (including XR and cloud gaming applications) due to reduced UL or DL transmission latency.

Embodiments are described in more detail below in the context of an UL CG. However, skilled persons will recognize that underlying principles of the described techniques are equally applicable to a DL SPS. For example, as discussed above, both UL CG and DL SPS have periodic resources and require similar activations/deactivations, such that both experience similar difficulties when the UE is in DRX and, thus, can benefit in the same or a similar manner when embodiments of the present disclosure are used.

According to various embodiments, a UE configured for DRX and with a type-2 UL CG can be triggered to wake up a duration before a next subsequent resource of the UL CG (e.g., a PUSCH transmission opportunity, timeslot, etc.) to monitor for an activation (or reactivation) DCI associated with the next subsequent UL CG resource. In other words, the UE wakes up to monitor PDCCH for an activation DCI. This wake-up can be in between successive DRX on durations of the UE's configured DRX cycle.

Figure 10:
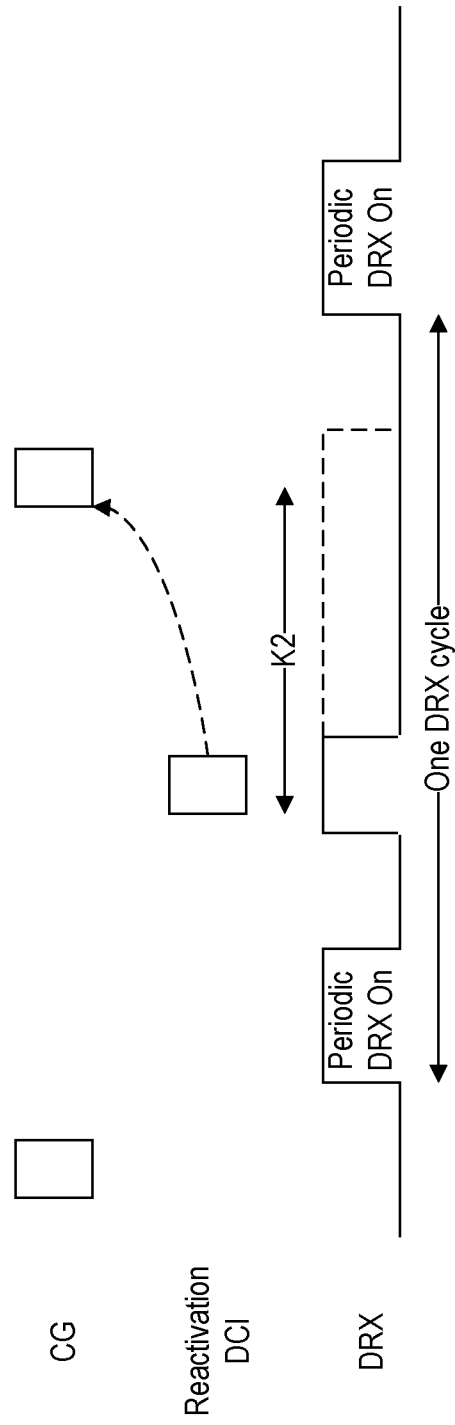
FIGS. 10-11 show two timing diagrams that illustrate operation of various embodiments of the present disclosure.

In some embodiments, the UE can be configured to wake up the duration before the next subsequent UL CG resource without a signal or command from the network to do so. For example, the UE can wake up for a DRX on duration that is time-aligned such that the UE can receive an activation DCI that is K2 slots before the next subsequent UL CG resource. FIG. 10 shows an exemplary timing arrangement in which the UE wakes up (i.e., DRX on) for a duration that is between two successive periodic DRX on durations of the UE's periodic DRX cycle. During this intermediate duration, the UE receives a reactivation DCI for an UL CG resource that is K2 slots after the activation DCI. If the UE has UL data to transmit, the UE may remain awake until transmitting the UL data in the UL CG resource, as indicated by the dashed lines for DRX in FIG. 10.

In other embodiments, the network can send the UE a command during one of the UE's periodic DRX on durations that precedes the next subsequent UL CG resource. This command (also referred to below as "wake-up command") can be an RRC message, a MAC control element (CE), a DCI, etc. The command can instruct the UE to wake up the duration before the next subsequent UL CG resource, in the same manner as described above. Such embodiments can be advantageous in terms of UE energy consumption because the UE wakes up outside of its periodic DRX on durations only when instructed by the network.

Figure 11:
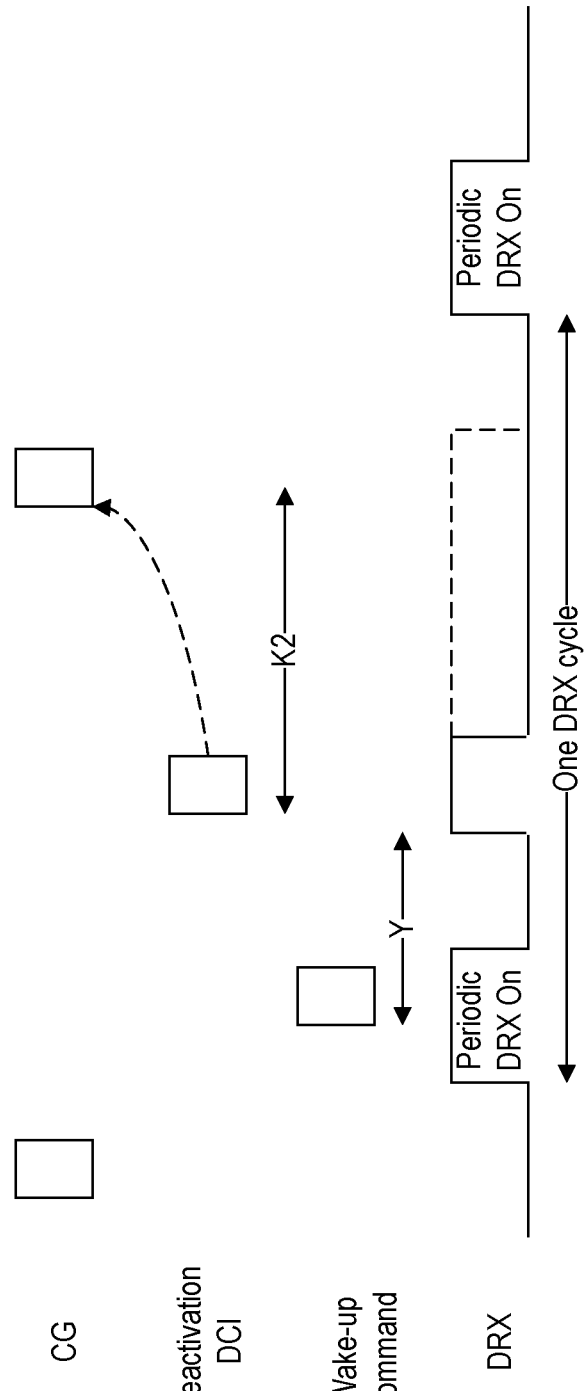

FIG. 11 shows an exemplary timing arrangement that illustrates these embodiments. The UE receives a wake-up command from the network during one of the periodic DRX on durations of the UE's periodic DRX cycle. The wake-up command indicates, either implicitly or explicitly, that the UE should wake up to monitor for an UL CG activation DCI at an offset Y after the wake-up command. Accordingly, the UE returns to sleep but wakes up again after the offset Y as instructed, i.e., in between two successive periodic DRX on durations of the UE's periodic DRX cycle. While awake, the UE receives a reactivation DCI in the same manner as discussed above in relation to FIG. 10.

The offset Y can be determined by gNB based on the UE's periodic DRX on durations and UL CG that needs to be activated. In some embodiments, the wake-up command can indicate the offset Y, but in other embodiments this can be implicit and/or preconfigured (e.g., as part of the UL CG). In some embodiments, the wake-up command can indicate how long time the UE shall remain awake after the offset Y, but in other embodiments this can be implicit and/or preconfigured (e.g., as part of the UL CG).

The channel quality estimation and resource allocation of the UL configured grant will be determined for the expected UL CG transmission resource and the activation DCI will be sent at the time when UE is awake in response to the wake-up command. The wake-up command can be sent at the closest preceding periodic DRX on duration for the UE. However, if one of the UE's periodic DRX on durations is K2 slots before the UL CG resource, the UE will be awake to receive the activation DCI and there is no need to send the wake-up command.

If the time from one of the UE's periodic DRX on durations to the UL CG resource is less than K2, the wake-up command can be sent during a previous one of the periodic DRX on durations and the reactivation DCI can be sent while the UE is awake (e.g., after offset Y) in a duration before the next one of the periodic DRX on durations. For example, the activation DCI can be sent before the UE's next DRX on duration for an UL CG resource that is K2 slots later, after the next one of the UE's periodic DRX on durations. In this manner, the channel estimation and resource allocation used for updating the UL CG is more accurate due to its proximity in time (i.e., only K2 slots apart).

In some embodiments, to avoid DRX mismatch problems caused by UE misdetection of a wake-up command, the UE can send a feedback message responsive to the wake-up command. For example, the feedback message can be HARQ feedback. In such case, the offset Y can be aligned with the time when the UE sends the feedback message. When the gNB receives the feedback message, it knows that the UE has awakened as requested and will send an activation DCI while the UE is still awake. In some embodiments, the wake-up command can be sent using DCI format 0_2, which is relatively smaller than other available DCI formats. This small size can improve detection reliability due to reduced likelihood of bit errors in the message (as compared to larger DCI formats).

Figure 12:
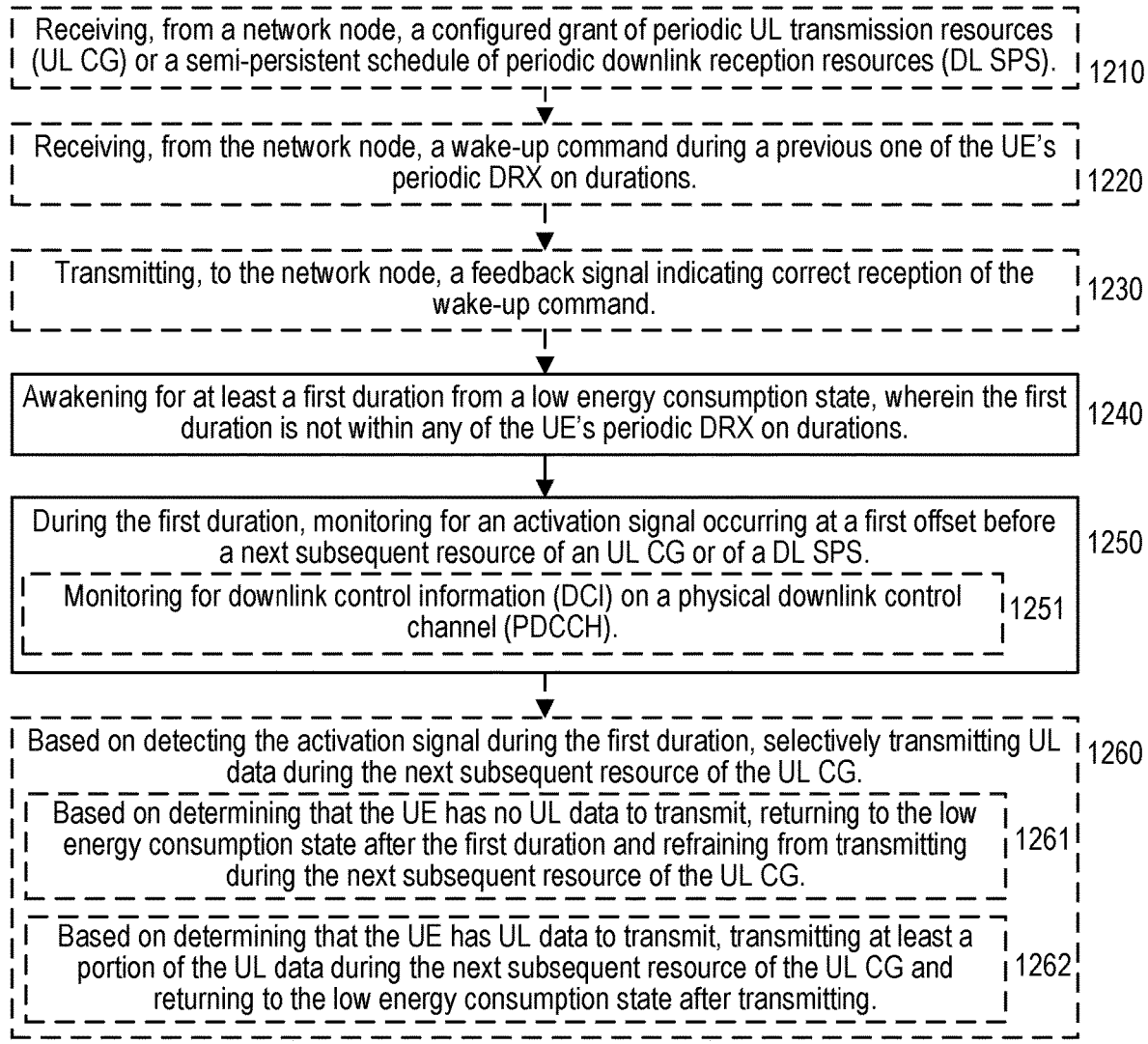
FIG. 12 shows a flow diagram of an exemplary method for a UE (e.g., wireless device), according to various embodiments of the present disclosure.
Figure 13:
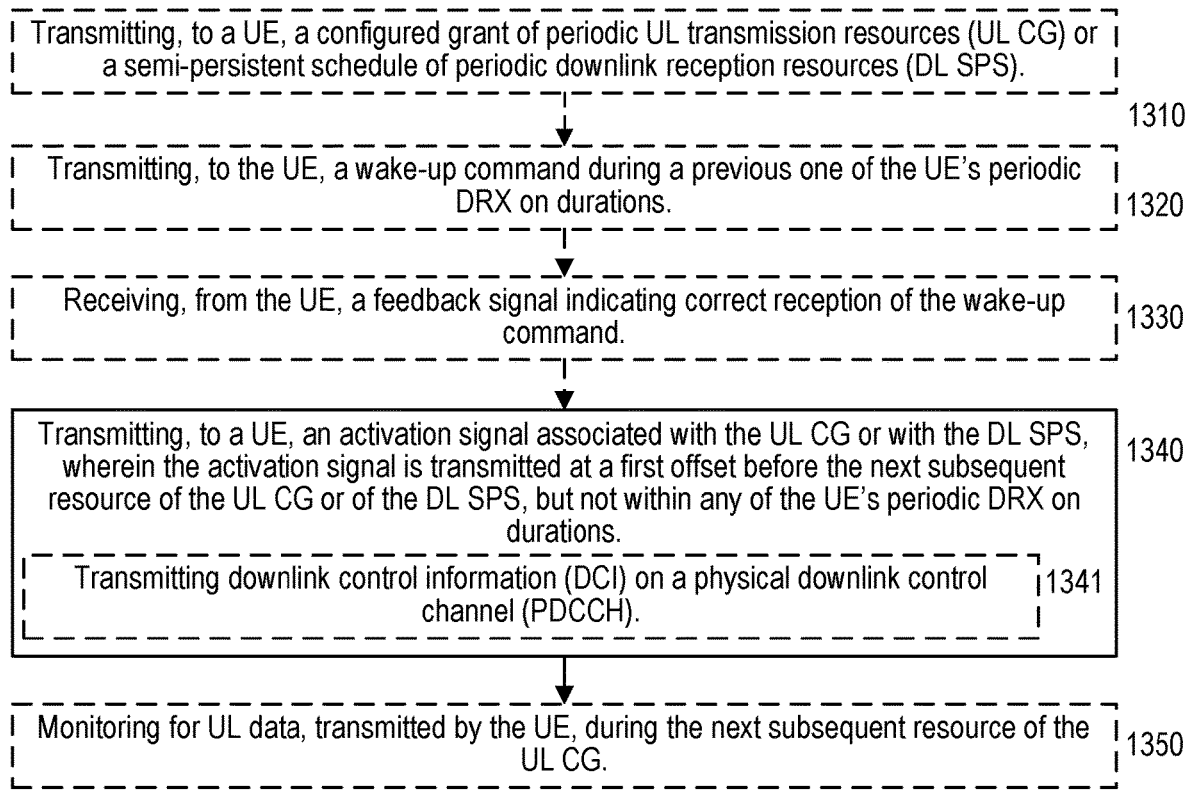
FIG. 13 shows a flow diagram of an exemplary method for a network node (e.g., base station, eNB, gNB, ng-eNB, etc.) of a wireless network (e.g., NG-RAN, E-UTRAN), according to various embodiments of the present disclosure.

Various features of the embodiments described above correspond to various operations illustrated in FIGS. 12-13, which show exemplary methods (e.g., procedures) for a UE and a network node, respectively. In other words, various features of the operations described below correspond to various embodiments described above. Furthermore, the exemplary methods shown in FIGS. 12-13 can be used cooperatively to provide various exemplary benefits described herein. Although FIGS. 12-13 show specific blocks in particular orders, the operations of the exemplary methods can be performed in different orders than shown and can be combined and/or divided into blocks having different functionality than shown. Optional blocks or operations are indicated by dashed lines.

In particular, FIG. 12 shows an exemplary method (e.g., procedure) for a UE configured to operate in a wireless network according to a periodic DRX cycle that includes periodic DRX on durations, according to various embodiments of the present disclosure. The exemplary method can be performed by a UE (e.g., wireless device, IoT device, etc.) such as described elsewhere herein.

The exemplary method can include the operations of block 1240, where the UE can awaken for at least a first duration from a low energy consumption state. The first duration is not within any of the periodic DRX on durations of the UE's periodic DRX cycle. The exemplary method can also include the operations of block 1250, where the UE can, during the first duration, monitor for an activation signal occurring at a first offset before a next subsequent resource of a configured grant of periodic uplink transmission resources (UL CG) or of a semi-persistent schedule of periodic downlink reception resources (DL SPS).

In some embodiments, the exemplary method can also include the operations of block 1210, where the UE can receive the UL CG or the DL SPS from a network node in the wireless network. For example, the UE can receive the UL CG or the DL SPS via an RRC message. In some embodiments, an indication of at least one of the following can be included in the received UL CG or the received DL SPS: a start of the first duration, a length of the first duration, and the first offset.

In some embodiments, the exemplary method can also include the operations of block 1260, where the UE can, based on detecting the activation signal during the first duration, selectively transmit UL data during the next subsequent resource of the UL CG. In some of these embodiments, selectively transmitting can include the operations of sub-block 1261, where the UE can, based on determining that it has no UL data to transmit, return to the low energy consumption state after the first duration and refrain from transmitting during the next subsequent resource of the UL CG. In some of these embodiments, selectively transmitting can include the operations of sub-block 1262, where the UE can, based on determining that it has UL data to transmit, transmit at least a portion of the UL data during the next subsequent resource of the UL CG and return to the low energy consumption state after transmitting.

In some embodiments, monitoring for the activation signal (e.g., in block 1250) can include the operations of sub-block 1251, where the UE can monitor for DCI on a PDCCH. In such embodiments, one of the following can apply:

the next subsequent resource is on a physical uplink shared channel (PUSCH) and the first offset is a PDCCH-PUSCH scheduling delay (K2); or the next subsequent resource is on a physical downlink shared channel (PDSCH) and the first offset is a PDCCH-PDSCH scheduling delay (K0).

In some of these embodiments, the first offset can be included in the DCI.

In some embodiments, the exemplary method can also include the operations of block 1220, where the UE can receive, from a network node in the wireless network, a wake-up command during a previous one of the UE's periodic DRX on durations. In such embodiments, awakening for at least the first duration (e.g., in block 1240) can be responsive to the wake-up command. FIG. 11 shows an example of these embodiments. In some of these embodiments, the wake-up command can be received in one of the following: DCI, MAC-layer CE, or RRC message.

In some of these embodiments, the wake-up command can be received in a DCI according to a format 0_2, discussed above. In some of these embodiments, an indication of at least one of the following can be included with the wake-up command: a start of the first duration, a length of the first duration, and the first offset. In some of these embodiments, the exemplary method can also include the operations of block 1230, where the UE can transmit, to the network node, a feedback signal indicating correct reception of the wake-up command. In some variants, the feedback signal can be transmitted during the first duration before monitoring for the activation signal (e.g., which can be sent in response to the network node receiving the feedback signal).

In addition, FIG. 13 shows an exemplary method (e.g., procedure) for a network node to communicate with a UE configured to operate according to a periodic DRX cycle that includes periodic DRX on durations, according to various embodiments of the present disclosure. The exemplary method can be performed by a network node (e.g., base station, eNB, gNB, ng-eNB, etc., or component thereof) in a wireless network (e.g., E-UTRAN, NG-RAN), such as network nodes described elsewhere herein.

The exemplary method can include the operations of block 1340, where the network node can transmit, to a UE, an activation signal associated with a configured grant of periodic uplink transmission resources (UL CG) or with a semi-persistent schedule of periodic downlink reception resources (DL SPS). The activation signal is transmitted at a first offset before the next subsequent resource of the UL CG or of the DL SPS, but not within any of the UE's periodic DRX on durations.

In some embodiments, the exemplary method can also include the operations of block 1310, where the network node can transmit the UL CG or the DL SPS to the UE. For example, the network node can transmit the UL CG or the DL SPS via an RRC message. In some embodiments, an indication of at least one of the following can be included in the transmitted UL CG or the transmitted DL SPS: a start of the first duration, a length of the first duration, and the first offset.

In some embodiments, the exemplary method can also include the operations of block 1350, where the network node can monitor for UL data, transmitted by the UE, during the next subsequent resource of the UL CG.

In some embodiments, transmitting the activation signal (e.g., in block 1340) can include the operations of sub-block 1341, where the UE can transmit DCI on PDCCH. In such embodiments, one of the following can apply:
the next subsequent resource is on a PUSCH and the first offset is a PDCCH-PUSCH scheduling delay (K2); or
the next subsequent resource is on a PDSCH and the first offset is a PDCCH-PDSCH scheduling delay (K0).

In some of these embodiments, the first offset can be included in the DCI.

In some embodiments, the exemplary method can also include the operations of block 1320, where the network node can transmit, to the UE, a wake-up command during a previous one of the UE's periodic DRX on durations. The wake-up command indicates that the UE should wake up during a subsequent first duration to monitor for the activation signal, and the first duration is not within any of the UE's periodic DRX on durations. FIG. 11 shows an example of these embodiments. In some of these embodiments, the wake-up command can be transmitted in one of the following: DCI, MAC-layer CE, or RRC message.

In some of these embodiments, the wake-up command can be transmitted in a DCI according to a format 0_2, discussed above. In some of these embodiments, an indication of at least one of the following can be included with the wake-up command: a start of the first duration, a length of the first duration, and the first offset.

In some of these embodiments, the exemplary method can also include the operations of block 1330, where the network node can receive, from the UE, a feedback signal indicating correct reception of the wake-up command. In some of these embodiments, the feedback signal can be received during the first duration and the activation signal can be transmitted (i.e., also in the first duration) in response to receiving the feedback signal.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 14:
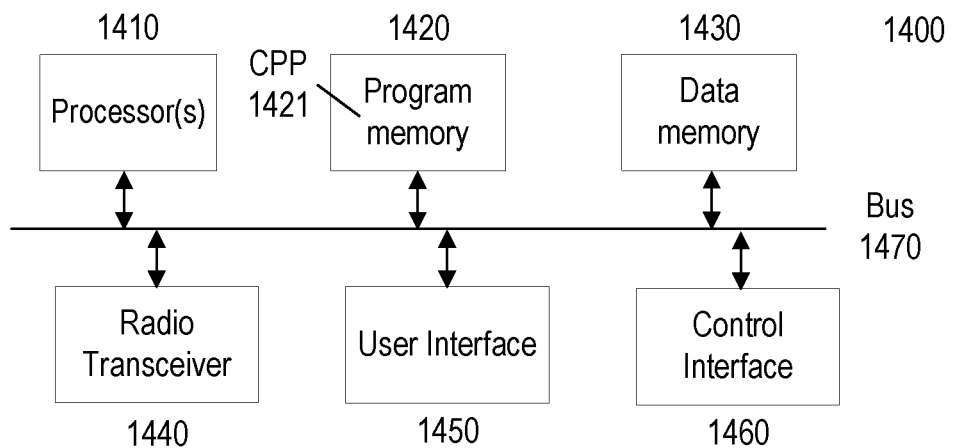
FIG. 14 shows a block diagram of an exemplary wireless device or UE, according to various embodiments of the present disclosure.

FIG. 14 shows a block diagram of an exemplary wireless device or user equipment (UE) 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product (CPP) 1421 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, SDAP, RRC, and NAS layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE 1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420 and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440 can include radio-frequency transmitter and/or receiver functionality that facilitates the UE 1400 to communicate with other equipment supporting like wireless communication standards and/or protocols. In some embodiments, the radio transceiver 1440 includes one or more transmitters and one or more receivers that enable UE 1400 to communicate according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some embodiments, radio transceiver 1440 includes one or more transmitters and one or more receivers that can facilitate the UE 1400 to communicate with various LTE, LTE-Advanced (LTE-A), and/or NR networks according to standards promulgated by 3GPP. In some embodiments of the present disclosure, the radio transceiver 1440 includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, to and/or supported by, data memory 1430.

User interface 1450 can take various forms depending on the particular embodiment of UE 1400, or can be absent from UE 1400 entirely. In some embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many embodiments of the UE 1400 having a touch screen display are capable of receiving user inputs, such as inputs related to exemplary methods described herein or otherwise known to persons of ordinary skill.

In some embodiments, UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various embodiments of the present disclosure.

A control interface 1460 of the UE 1400 can take various forms depending on the particular embodiment of UE 1400 and of the particular interface requirements of other devices that the UE 1400 is intended to communicate with and/or control. For example, the control interface 1460 can comprise an RS-232 interface, a USB interface, an HDMI interface, a Bluetooth interface, an IEEE ("Firewire") interface, an I$^2$C interface, a PCMCIA interface, or the like. In some embodiments of the present disclosure, control interface 1460 can comprise an IEEE 802.3 Ethernet interface such as described above. In some embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any embodiments (e.g., of methods) described herein.

Figure 15:
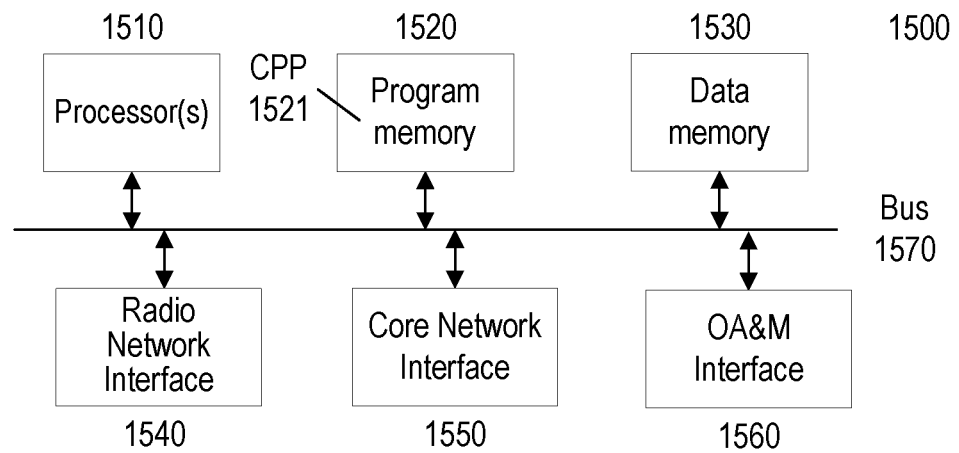
FIG. 15 shows a block diagram of an exemplary network node according to various embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520 can store software code, programs, and/or instructions (collectively shown as computer program product (CPP) 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1540 and/or core network interface 1550. By way of example, core network interface 1550 can comprise the S1 or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some embodiments, interface 1540 can also enable network node 1500 to communicate with compatible satellites of a satellite communication network. In some embodiments, radio network interface 1540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some embodiments, core network interface 1550 can comprise the NG interface standardized by 3GPP. In some embodiments, core network interface 1550 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1500 can include hardware and/or software that configures and/or facilitates network node 1500 to communicate with other network nodes in a RAN, such as with other eNBs, gNBs, ng-eNBs, en-gNBs, IAB nodes, etc. Such hardware and/or software can be part of radio network interface 1540 and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
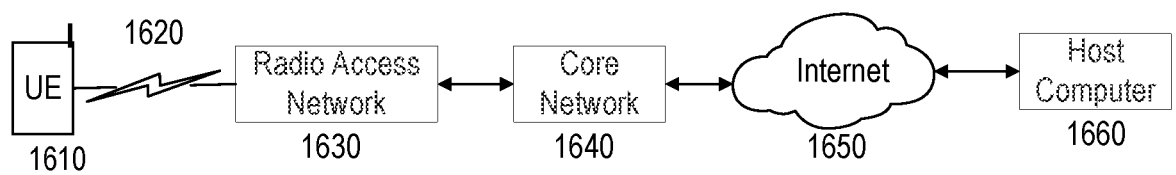
FIG. 16 shows a block diagram of an exemplary network configured to provide over-the-top (OTT) data services between a host computer and a UE, according to various embodiments of the present disclosure.

FIG. 16 is a block diagram of an exemplary communication network configured to provide over-the-top (OTT) data services between a host computer and a user equipment (UE), according to one or more embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some embodiments, RAN 1630 and core network 1640 can be configured and/or arranged as shown in other figures discussed above. For example, eNBs comprising an evolved UTRAN (E-UTRAN) 1630 can communicate with an evolved packet core (EPC) network 1640 via an S1 interface. As another example, gNBs and ng-eNBs comprising an NG-RAN 1630 can communicate with a 5GC network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 16 can also include measurement procedures and/or sensors that monitor network performance metrics including data rate, latency and other factors that are improved by embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The embodiments described herein provide flexible and efficient techniques for UL CG or DL SPS activation for a UE operating in DRX, such that a UE can take advantage of available resources (e.g., transmission or reception opportunities) without excess latency. Such techniques can reduce and/or eliminate excess UL or DL transmission latency without requiring aligning of an activation DCI to a UE's DRX on duration. Moreover, these techniques facilitate better BLER performance for UL CG or DL SPS transmissions, since the network (or UE) can receive UL CG (or DL SPS) transmissions that are more proximate in time to corresponding UL (or DL) channel estimates. Overall, these techniques facilitate more efficient usage of available transmission resources (e.g., frequency spectrum), energy-efficient UE operation via DRX, and improved quality-of-experience for users of various applications (including XR and cloud gaming applications) due to reduced UL or DL transmission latency.

When used in NR UEs (e.g., UE 1610) and gNBs (e.g., gNBs comprising RAN 1630), these improvements can increase the use of OTT data services—including XR applications—by providing better QoE to OTT service providers and end users. Consequently, this increases the value of such services to both end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be to performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) configured to operate in a wireless network according to periodic discontinuous reception (DRX) cycles comprising periodic DRX on durations, the method comprising:
  awakening for at least a first duration from a low energy consumption state, wherein the first duration is not within any of the DRX on durations; and
  during the first duration, monitoring for an activation signal occurring at a first offset before a next subsequent transmission resource of a configured grant of periodic UL transmission resources (UL CG).

A2. The method of embodiment A1, further comprising receiving the UL CG from a network node in the wireless network.

A3. The method of embodiment A2, wherein an indication of at least one of the following is included in the received UL CG: a start of the first duration, a length of the first duration, and the first offset.

A4. The method of any of embodiments A1-A3, further comprising, based on detecting the activation signal during the first duration, selectively transmitting UL data during the next subsequent transmission resource of the UL CG.

A5. The method of embodiment A4, wherein selectively transmitting comprises, based on determining that the UE has no UL data to transmit, returning to the low energy consumption state after the first duration and refraining from transmitting during the next subsequent transmission resource of the UL CG.

A6. The method of any of embodiments A4-A5, wherein selectively transmitting comprises, based on determining that the UE has UL data to transmit, transmitting at least a portion of the UL data during the next subsequent transmission resource of the UL CG and returning to the low energy consumption state after transmitting.

A7. The method of any of embodiments A1-A6, wherein:
  monitoring for the activation signal comprises monitoring for downlink control information (DCI) on a physical downlink control channel (PDCCH);
  the next subsequent transmission resource is on a physical uplink shared channel (PUSCH); and
  the first offset is a PDCCH-PUSCH scheduling delay (K2).

A8. The method of embodiment A7, wherein the first offset is included in the DCI.

A9. The method of any of embodiments A1-A8, further comprising receiving, from a network node in the wireless network, a wake-up command during a previous DRX on duration, wherein awakening for at least the first duration is responsive to the wake-up command.

A10. The method of embodiment A9, wherein the wake-up command is received in one of the following:
  downlink control information (DCI) for physical layer (PHY);
  media access control (MAC) layer control element (CE);

radio resource control (RRC) message.

A11. The method of embodiment A10, wherein the wake-up command is received in a DCI according to format 0_2.

A12. The method of any of embodiments A9-A11, wherein an indication of at least one of the following is included with the wake-up command: a start of the first duration, a length of the first duration, and the first offset.

A13. The method of any of embodiments A9-A12, further comprising transmitting, to the network node, a feedback signal indicating correct reception of the wake-up command.

A14. The method of embodiment A13, wherein the feedback signal is transmitted during the first duration before monitoring for the activation signal.

B1. A method for a network node, of a wireless network, to communicate with a user equipment (UE) configured to operate according to periodic discontinuous reception (DRX) cycles comprising periodic DRX on durations, the method comprising:
transmitting, to a UE, an activation signal associated with a configured grant of periodic UL transmission resources (UL CG), wherein the activation signal is transmitted at a first offset before the next subsequent transmission resource of the UL CG, but not during any of the DRX on durations for the UE.

B2. The method of embodiment B1, further comprising transmitting the UL CG to the UE.

B3. The method of embodiment B2, wherein an indication of at least one of the following is included in the transmitted UL CG: a start of the first duration, a length of the first duration, and the first offset.

B4. The method of any of embodiments B1-B3, further comprising monitoring for UL data, transmitted by the UE, during the next subsequent transmission resource of the UL CG.

B5. The method of any of embodiments B1-B4, wherein:
transmitting the activation signal comprises transmitting downlink control information (DCI) on a physical downlink control channel (PDCCH);
the next subsequent transmission resource is on a physical uplink shared channel (PUSCH); and
the first offset is a PDCCH-PUSCH scheduling delay (K2).

B6. The method of embodiment B5, wherein the first offset is included in the DCI.

B7. The method of any of embodiments B1-B6, further comprising transmitting, to the UE, a wake-up command during a previous DRX on duration, wherein:
the wake-up command indicates that the UE should wake up during a subsequent first duration to monitor for the activation signal; and
the first duration is not within any of the DRX on durations for the UE.

B8. The method of embodiment B7, wherein the wake-up command is transmitted in one of the following:
downlink control information (DCI) for physical layer (PHY);
media access control (MAC) layer control element (CE);
radio resource control (RRC) message.

B9. The method of embodiment B8, wherein the wake-up command is transmitted in a DCI according to format 0_2.

B10. The method of any of embodiments B7-B9, wherein an indication of at least one of the following is included with the wake-up command: a start of the first duration, a length of the first duration, and the first offset.

B11. The method of any of embodiments B7-B10, further comprising receiving, from the UE, a feedback signal indicating correct reception of the wake-up command.

B12. The method of embodiment B11, wherein:
the feedback signal is received during the first duration; and
transmitting the activation signal is responsive to receiving the feedback signal.

C1. A user equipment (UE) configured to operate in a wireless network according to periodic discontinuous reception (DRX) cycles comprising periodic DRX on durations, the UE comprising:
radio transceiver circuitry configured to communicate with a network node in the wireless network; and
processing circuitry operatively coupled to the radio transceiver circuitry, whereby the processing circuitry and the radio transceiver circuitry are configured to perform operations corresponding to any of the methods of embodiments A1-A14.

C2. A user equipment (UE) configured to operate in a wireless network according to periodic discontinuous reception (DRX) cycles comprising periodic DRX on durations, the UE being further arranged to perform operations corresponding to any of the methods of embodiments A1-A14.

C3. A non-transitory, computer-readable medium storing computer-executable instructions that, when executed by processing circuitry of a user equipment (UE) configured to operate in a wireless network according to periodic discontinuous reception (DRX) cycles comprising periodic DRX on durations, configure the UE to perform operations corresponding to any of the methods of embodiments A1-A14.

C4. A computer program product comprising computer-executable instructions that, when executed by processing circuitry of a user equipment (UE) configured to operate in a wireless network according to periodic discontinuous reception (DRX) cycles comprising periodic DRX on durations, configure the UE to perform operations corresponding to any of the methods of embodiments A1-A14.

D1. A network node, of a wireless network, arranged to communicate with a user equipment (UE) configured to operate according to periodic discontinuous reception (DRX) cycles comprising periodic DRX on durations, the network node comprising:
radio network interface circuitry configured to communicate with the UE; and
processing circuitry operatively coupled to the radio network interface circuitry, whereby the processing circuitry and the radio network interface circuitry are configured to perform operations corresponding to any of the methods of embodiments B1-B12.

D2. A network node, of a wireless network, arranged to communicate with a user equipment (UE) configured to operate according to periodic discontinuous reception (DRX) cycles comprising periodic DRX on durations, the network node being further arranged to perform operations corresponding to any of the methods of embodiments B1-B12.

D3. A non-transitory, computer-readable medium storing computer-executable instructions that, when executed by processing circuitry of a network node arranged to communicate with a user equipment (UE) configured to operate according to periodic discontinuous reception (DRX) cycles comprising periodic DRX on durations, configure the network node to perform operations corresponding to any of the methods of embodiments B1-B12.

D4. A computer program product comprising computer-executable instructions that, when executed by processing circuitry of a network node arranged to communicate with a user equipment (UE) configured to operate according to periodic discontinuous reception (DRX) cycles comprising periodic DRX on durations, configure the network node to perform operations corresponding to any of the methods of embodiments B1-B12.

The invention claimed is:

1. A method for a user equipment (UE) configured to operate in a wireless network according to a periodic discontinuous reception (DRX) cycle that includes periodic DRX on durations, the method comprising:
   awakening for at least a first duration from a low energy consumption state, wherein the first duration is not within any of the periodic DRX on durations;
   during the first duration, monitoring for an activation signal occurring at a first offset before a next subsequent resource of one of the following: a configured grant of periodic uplink transmission resources (UL CG), or a semi-persistent schedule of periodic downlink reception resources (DL SPS);
   based on detecting the activation signal during the first duration, determining whether the UE has UL data to transmit during the next subsequent resource of the UL CG;
   based on determining that the UE has no UL data to transmit, returning to the low energy consumption state after the first duration and refraining from transmitting during the next subsequent resource of the UL CG; and
   based on determining that the UE has UL data to transmit, transmitting at least a portion of the UL data during the next subsequent resource of the UL CG and returning to the low energy consumption state after transmitting.

2. The method of claim 1, further comprising receiving the UL CG or the DL SPS from a network node in the wireless network, wherein an indication of at least one of the following is included in the received UL CG or the received DL SPS: a start of the first duration, a length of the first duration, and the first offset.

3. The method of claim 1, wherein:
   monitoring for the activation signal comprises monitoring for downlink control information (DCI) on a physical downlink control channel (PDCCH); and
   one of the following applies:
      the next subsequent resource is on a physical uplink shared channel (PUSCH) and the first offset is a PDCCH-PUSCH scheduling delay (K2); or
      the next subsequent resource is on a physical downlink shared channel (PDSCH) and the first offset is a PDCCH-PDSCH scheduling delay (K0).

4. The method of claim 3, wherein the first offset is included in the DCI.

5. The method of claim 1, further comprising receiving, from a network node in the wireless network, a wake-up command during a previous one of the UE's periodic DRX on durations, wherein:
   awakening for at least the first duration is responsive to the wake-up command; and
   an indication of at least one of the following is included with the wake-up command: a start of the first duration, a length of the first duration, and the first offset.

6. The method of claim 5, wherein the wake-up command is received in one of the following:
   downlink control information (DCI) for physical layer (PHY), according to a DCI format 0_2;
   media access control (MAC) layer control element (CE); or
   radio resource control (RRC) message.

7. The method of claim 5, further comprising transmitting, to the network node, a feedback signal indicating correct reception of the wake-up command.

8. The method of claim 7, wherein the feedback signal is transmitted during the first duration before monitoring for the activation signal.

9. A user equipment (UE) configured to operate in a wireless network according to a periodic discontinuous reception (DRX) cycle that includes periodic DRX on durations, the UE comprising:
   radio transceiver circuitry configured to communicate with a network node in the wireless network; and
   processing circuitry operatively coupled to the radio transceiver circuitry, whereby the processing circuitry and the radio transceiver circuitry are configured to:
      awaken for at least a first duration from a low energy consumption state, wherein the first duration is not within any of the periodic DRX on durations;
      during the first duration, monitor for an activation signal occurring at a first offset before a next subsequent resource of one of the following: a configured grant of periodic uplink transmission resources (UL CG), or a semi-persistent schedule of periodic downlink reception resources (DL SPS);
      based on detection of the activation signal during the first duration, determine whether the UE has UL data to transmit during the next subsequent resource of the UL CG;
      based on a determination that the UE has no UL data to transmit, return to the low energy consumption state after the first duration and refraining from transmitting during the next subsequent resource of the UL CG; and
      based on a determination that the UE has UL data to transmit, transmit at least a portion of the UL data during the next subsequent resource of the UL CG and returning to the low energy consumption state after transmitting.

10. The UE of claim 9, wherein:
    the processing circuitry and the radio transceiver circuitry are further configured to receive the UL CG or the DL SPS from a network node in the wireless network; and
    an indication of at least one of the following is included in the received UL CG or the received DL SPS: a start of the first duration, a length of the first duration, and the first offset.

11. The UE of claim 9, wherein:
    the processing circuitry and the radio transceiver circuitry are configured to monitor for the activation signal based on monitoring for downlink control information (DCI) on a physical downlink control channel (PDCCH); and
    one of the following applies:
       the next subsequent resource is on a physical uplink shared channel (PUSCH) and the first offset is a PDCCH-PUSCH scheduling delay (K2); or
       the next subsequent resource is on a physical downlink shared channel (PDSCH) and the first offset is a PDCCH-PDSCH scheduling delay (K0).

12. The UE of claim 11, wherein the first offset is included in the DCI.

13. The UE of claim 9, wherein the processing circuitry and the radio transceiver circuitry are further configured to receive, from a network node in the wireless network, a wake-up command during a previous one of the UE's periodic DRX on durations, wherein:
- awakening for at least the first duration is responsive to the wake-up command; and
- an indication of at least one of the following is included with the wake-up command: a start of the first duration, a length of the first duration, and the first offset.

14. The UE of claim 13, wherein the wake-up command is received in one of the following:
- downlink control information (DCI) for physical layer (PHY), according to a DCI format 0_2;
- media access control (MAC) layer control element (CE); or
- radio resource control (RRC) message.

15. The UE of claim 13, wherein the processing circuitry and the radio transceiver circuitry are further configured to transmit, to the network node, a feedback signal indicating correct reception of the wake-up command.

16. The UE of claim 15, wherein the feedback signal is transmitted during the first duration before monitoring for the activation signal.

\* \* \* \* \*